United States Patent [19]

Tuan et al.

[11] Patent Number: 4,646,163

[45] Date of Patent: Feb. 24, 1987

[54] ION PROJECTION COPIER

[75] Inventors: Hsing C. Tuan; Malcolm J. Thompson, both of Palo Alto, Calif.

[73] Assignee: Xerox Corporation, Stamford, Conn.

[21] Appl. No.: 784,293

[22] Filed: Oct. 7, 1985

[51] Int. Cl.[4] .............................................. G01D 15/06

[52] U.S. Cl. .................................... 358/300; 346/154; 346/155; 346/159

[58] Field of Search ............... 346/154, 155, 159, 160, 346/74.2; 358/296, 300

[56] References Cited

U.S. PATENT DOCUMENTS

| | | | |
|---|---|---|---|
| 3,323,131 | 5/1967 | MacGriff | 346/74 |
| 3,594,162 | 7/1971 | Simm et al. | 96/1 |
| 4,463,363 | 7/1984 | Gundlach et al. | 346/159 |
| 4,524,371 | 6/1985 | Sheridon et al. | 346/159 |

*Primary Examiner*—E. A. Goldberg
*Assistant Examiner*—Linda M. Peco
*Attorney, Agent, or Firm*—Serge Abend

[57] ABSTRACT

A fluid jet assisted ion projection copier including a marking head incorporating an array of thin film ion modulating electrodes and photosensors integrated upon a single substrate. An optical projection system places incremental images of light and dark areas from an original to be copied onto the photosensor array. The marking head is mounted upon the ion projection housing, adjacent an outlet channel thereof for controlling the passage of ions out of the housing in accordance with the projected pattern of light and dark areas.

14 Claims, 12 Drawing Figures

ION PROJECTION COPIER

FIELD OF THE INVENTION

This invention relates to a copier based upon the fluid jet assisted ion projection electrographic marking process. The ion generation and transport housing of the apparatus is provided with a marking head disposed adjacent its outlet channel. The marking head incorporates an array of thin film ion modulating electrodes and photosensors integrated upon a single substrate. Each ion-modulating electrode is driven directly by its associated photosensor, in accordance with optical information projected from an original to be copied.

BACKGROUND OF THE INVENTION

The imaging process utilized herein is described, with respect to a fluid jet assisted ion projection printer, in commonly assigned U.S. Pat. No. 4,463,363 issued July 31, 1984, in the names of Robert W. Gundlach and Richard L. Bergen, and entitled "Fluid Jet Assisted Ion Projection Printing". In the printer described in that patent, imaging ions are first generated and then are deposited upon a moving receptor sheet, such as paper, by means of a linear array of selectively controllable, closely spaced, minute air "nozzles". The ions of a single polarity, preferably positive, are generated in an ionization chamber by a high voltage corona discharge and are then transported, by being entrained in a high velocity fluid, to and through the "nozzles", wherein they are electrically controlled by an electric potential applied to modulating electrodes. Selective application of control voltages to the modulating electrodes in the array will establish a field across the "nozzle" to inhibit passage of ions through each "nozzle". Alternately, ions will be allowed to pass through the "nozzle", if the field is below a threshold value, so as to enable areas of charge to appear on a receptor surface for subsequent development.

A typical modulating structure for this type of printer is disclosed in commonly assigned U.S. Pat. No. 4,524,371 issued June 18, 1985 in the names of Nicholas K. Sheridon and Michael A. Berkovitz and entitled "Modulation Structure for Fluid Jet Assisted Ion Projection Printing Apparatus". The modulating structure is formed upon a planar marking head, illustrated in FIGS. 7, 8 and 9, mounted on the ion-generating housing, and each electrode thereon may be addressed individually for modulating each "nozzle" independently.

An improved, integrated, printer marking head, incorporating thin film ion-modulating electrodes, drive circuitry, and switching elements formed upon a single substrate is disclosed in copending commonly assigned U.S. patent application Ser. No. 639,983, filed Aug. 13, 1984 in the names of Hsing C. Tuan and Malcolm J. Thompson, entitled "Marking Head for Fluid Jet Assisted Ion Projection Imaging Systems", now U.S. Pat. No. 4,584,592.

The printers described in the Gundlach et al and the Sheridon et al patents and the Tuan et al application rely upon the selective imposition of electrical data on their modulation electrodes. The data may be computer generated and/or controlled and is normally applied by any conventional data-addressing technique.

In yet another copending, commonly assigned, U.S. patent application Ser. No. 646,549 filed Sept. 4, 1984 in the names of Gene F. Day and Lloyd D. Clark, entitled "Ion Projection Copier", now, U.S. Pat. No. 4,591,885 the principle of the fluid jet assisted ion projection marking process is incorporated in an apparatus for copying original images onto an image receptor. This is accomplished by causing an optical input to address a photoconductive modulation assembly formed at one end of a lightcollecting ribbon.

U.S. Pat. Nos. 3,323,131 (MacGriff) and 3,594,162 (Simm et al) are also of interest, as they relate to the use of photoconductive materials for controlling electrographic charge deposition. In the MacGriff patent, an image-control device comprises a light-sensitive layer sandwiched between a transparent electrode layer and individual conductive stripes. Optical images are projected upon the control device for controlling the emission of the conductive stripes. In Simm et al, the lip of a projection gap has a photoconductive strip formed thereon for controlling the field across the gap, to affect the passage of ions through the gap.

It would be desirable to provide an inexpensive, highly reliable electronic copier in which the construction of the modulation electrodes and their relationship to the optical sensing structure is greating simplified relative to the Day et al structure. To that end, it is the primary object of the present invention to provide a marking head, for controlling the flow of ions through the ion projector, having integrally fabricated thereon thin film elements, including modulating electrodes, a photosensor circuit associated with each electrode, and suitable bus lines.

SUMMARY OF THE INVENTION

The present invention may be carried out, in one form, by providing a fluid jet assisted ion projection copier including ion projection means for projecting ions upon a charge receptor surface, comprising an ion generator, an inlet channel and an outlet channel connected to the ion generator, a source of transport fluid in communication with the inlet channel for delivering transport fluid to move ions through the outlet channel, and modulation means located adjacent the outlet channel for controlling the passage of ions therethrough. Optical projection means is provided for projecting incremental images of light and dark areas of an original to be copied upon a writing head mounted upon the ion projection means adjacent to the outlet channel. The writing head includes thin film elements integrally formed thereon including an array of modulating electrodes elongated in the direction of fluid flow, an array of photosensors, one photosensor being associated with each modulating electrode, and a bias potential bus for charging selected ones of the modulating electrodes in response to the state of illumination projected on selected ones of the photosensors.

BRIEF DESCRIPTION OF THE DRAWINGS

Further features and advantages of this invention will be apparent from the following, more particular, description considered together with the accompanying drawings, wherein.

DETAILED DESCRIPTION OF THE ILLUSTRATED EMBODIMENTS

Figure 1:
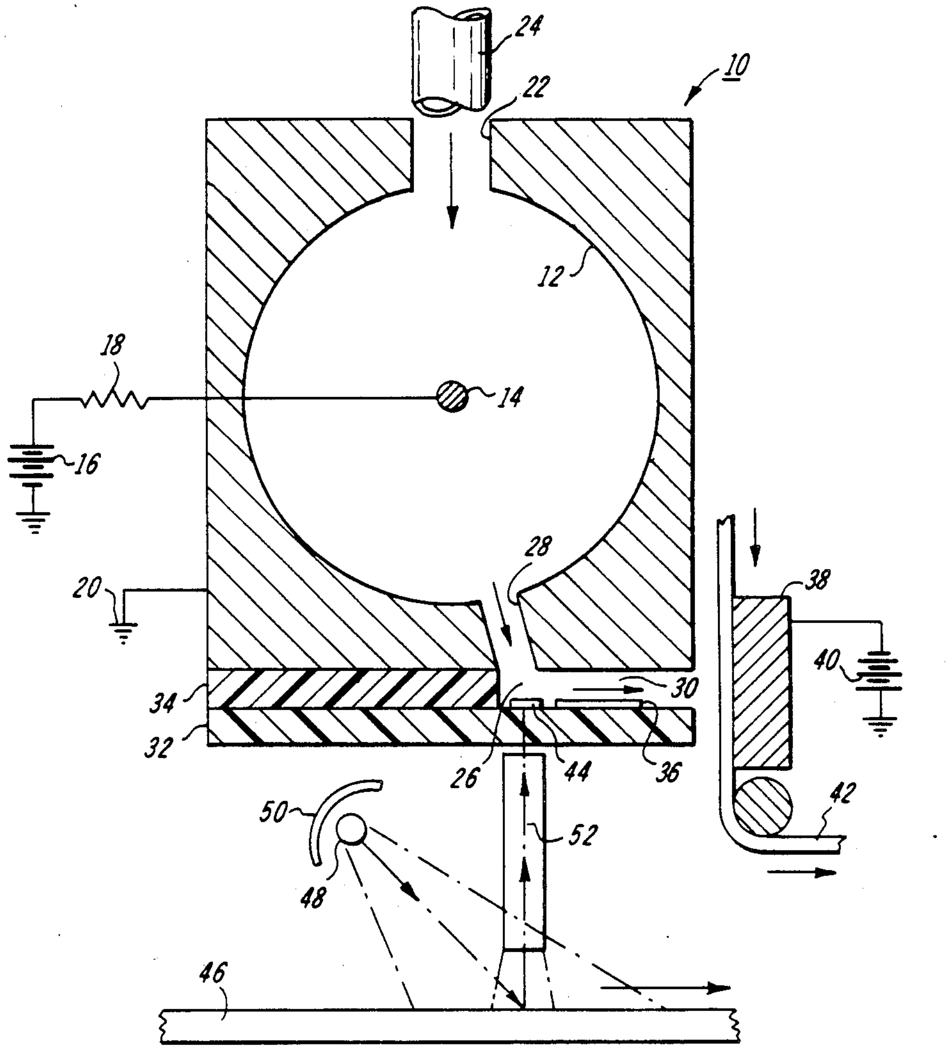
FIG. 1 is a schematic representation of an electronic copier according to the present invention.

With particular reference to the drawings, there is illustrated in FIG. 1 a housing 10 similar to the fluid jet assisted ion projection printing apparatus of assignee's U.S. Pat. No. 4,524,371. The housing includes an electrically conductive, elongated chamber 12 and a corona discharge wire 14, extending along the length of the chamber. A high potential source 16, on the order of several thousand volts dc, is connected to the wire 14 through a suitable load resistor 18, and a reference potential source 20 (which may be ground) is connected to the wall of chamber 12. Upon application of the high potential to corona discharge wire 14, a corona discharge surrounds the wire, creating a source of ions of a given polarity (preferably positive), which are attracted to the grounded chamber wall and fill the chamber with a space charge.

An inlet channel 22 extends along the chamber substantially parallel to wire 14, to deliver pressurized transport fluid (preferably air) into the chamber 12 from a suitable source, schematically illustrated by the tube 24. An outlet channel 26, from the chamber 12, also extends substantially parallel to wire 14, at a location opposed to inlet channel 22, for conducting the ion laden transport fluid to the exterior of the housing 10. The outlet channel 26 comprises two portions, a first portion 28 directed substantially radially outwardly from the chamber and a second portion 30 angularly disposed to the first portion. The second portion 30 is formed by the unsupported extension of a marking head 32 spaced from and secured to the housing by insulating shim 34. As the ion laden transport fluid passes through the outlet channel 26, it flows over an array of ion modulation electrodes 36, each extending in the direction of the fluid flow, and integrally formed on the marking head 32.

Ions allowed to pass completely through and out of the housing 10, through the outlet channel 26, come under the influence of accelerating back electrode 38 which is connected to a high potential source 40, on the order of several thousand volts dc, of a sign opposite to that of the corona source 16. An insulating charge receptor 42, such as paper, is interposed between the accelerating back electrode and the housing, and is moved over the back electrode for collecting the ions upon its surface in a image configuration. Subsequently the latent image charge pattern may be made visible by suitable development apparatus (not shown). Alternatively, a transfer system may be employed, wherein the charge pattern is deposited upon an insulating intermediate surface such as a dielectric drum or belt. In such a case, the latent image charge pattern may be made visible by development upon the dielectric surface and then transferred to a final image receptor sheet.

Once the ions have been swept into the outlet channel 26 by the transport fluid, it becomes necessary to render the ion-laden fluid stream intelligible.

This is accomplished by selectively controlling the potential on modulation electrodes 36 by means of photosensors 44 also integrally formed upon the marking head. In order to duplicate an original document 46 upon the charge receptor 42, the original is illuminated by a suitable light source 48. A reflector 50 concentrates the optical energy upon the original, with some of the optical energy falling within the collection angle of lens system 52. The light reflected from the original document passes through the lens system, then passes through the substrate of the marking head 32 for projecting patterns of light and dark areas from the original document 46 onto the sensors 44. Preferably, the lens system is in the form of a short optical length elongated lens strip of the Selfoc or graded index focusing type. Of course, in this configuration the substrate is made of any suitable, optically transparent material.

Figure 1A:
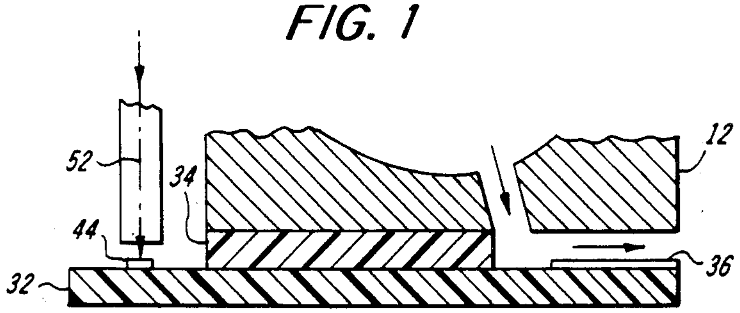
FIG. 1A is a partial view of the electronic copier of FIG. 1 showing the marking head receiving optical information from the opposite side.

In FIG. 1A there is illustrated an alternative embodiment of the present invention, in which the substrate need not be transparent. In this form, the photosensors 44 are formed remotely from the moculating electrodes 36 and the light reflected from the original document passes through the lens system 52 without passing through the substrate.

As described in U.S. Pat. No. 4,463,363, once the ions in the transport fluid stream come under the influence of the modulation electrode, they may be viewed as individual "beams", which may be allowed to pass to the receptor sheet 42 or to be suppressed within the outlet channel 26. "Writing" of a single spot in a raster line is accomplished when the modulation electrode is selectively connected to a potential source at substantially the same potential as that on the opposing wall of the outlet channel. With both walls bridging the channel being at about the same electrical potential, there will be substantially no electrical field extending thereacross. Thus, ions passing therethrough will be unaffected and will exit the housing to be deposited upon the charge receptor. Conversely, when a suitable potential is applied to the modulation electrode, a field will extend across the outlet channel to the opposite, electrically grounded, wall. If the electrical potential imposed on the modulation electrode is of the same sign as the ions, the ion "beam" will be repelled from the modulation electrode to the opposite wall where the ions may recombine into uncharged, or neutral, air molecules. If the electrical potential imposed on the modulation electrode is of the opposite sign as the ions, the ion "beam" will be attracted to the modulation electrode where they may recombine into uncharged, or neutral, air molecules. Therefore, that "beam" of transport fluid, exiting from the housing in the vicinity of that modulation electrode, will carry substantially no "writing" ions. Voltages of intermediate magnitude will cause the ion current to be proportional thereto, allowing gray scale writing upon the charge receptor. An imagewise pattern of information will be formed by selectively controlling each of the modulation electrodes in the array so that the ion "beams" associated therewith, either exit or are inhibited from exiting the housing in accordance with the pattern and intensity of light and dark spots on the original to be copied.

Figure 2:
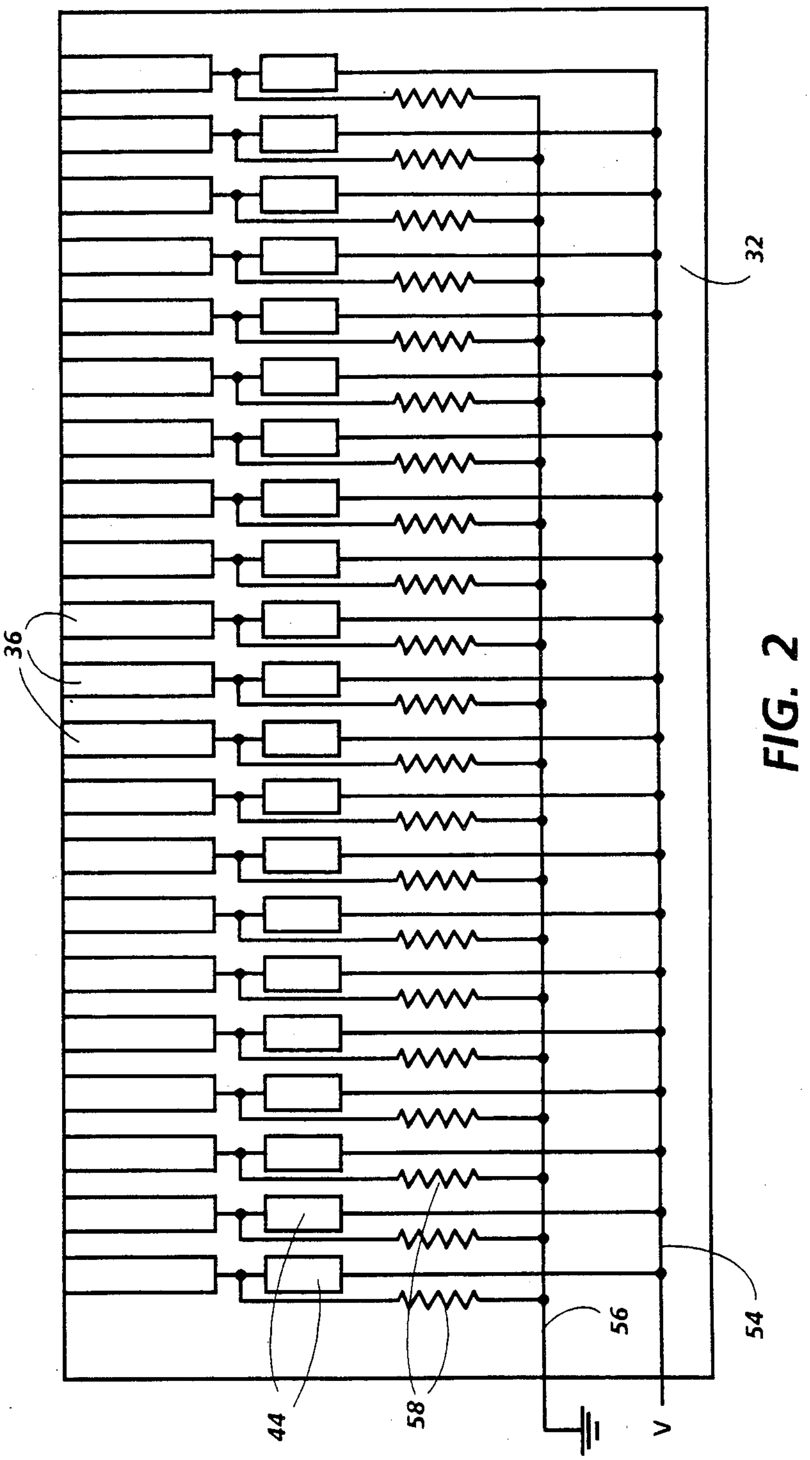
FIG. 2 is a schematic representation of one form of the marking head of the present invention showing an array of marking electrodes and sensor circuits.
Figure 3:
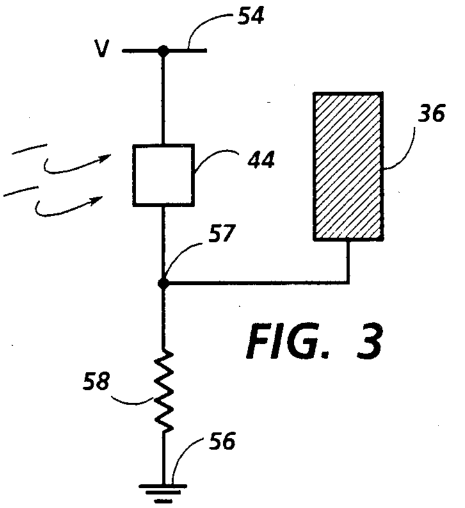
FIG. 3 is a schematic representation of a single stage of the array illustrated in FIG. 2.

Our invention for direct electronic copying is more specifically shown in FIGS. 2 and 3, wherein there is illustrated one configuration of a large area marking head 32 which may be used with the apparatus shown in FIG. 1. A suitable planar substrate of dielectric material (preferably transparent, such as glass) has fabricated thereon, by standard thin film deposition techniques, an array of metallic modulation electrodes 36 at a density of about 300 per inch. At that density, each modulation electrode would be, for example, 2.5 mils wide, spaced from one another by 0.8 mils. The electrodes are about 60 mils long.

An array of photosensors 44, each approximately 2.5 mils by 2.5 mils, is also integrally fabricated on the substrate by standard thin film deposition techniques. Each sensor is located so that it is associated with and is electrically connected to each modulation electrode 36. A drive potential bus 54, to which each sensor is connected, extends across the substrate and is connected to a drive potential V preferably on the order of 20 or 30 volts dc. A ground bus 56, also extending across the substrate, is connected to each potential divider node 57 through load resistor 58. The drive potential bus 54, the ground bus 56, the load resistors 58 and all interconnecting conductive traces are also integrally fabricated upon the substrate by standard thin film deposition techniques.

It will be understood from the following description of the operation of a single stage of the array of FIG. 2 (as illustrated in FIG. 3) that the manner in which direct electronic copying is accomplished by our invention, is both simple and elegant. When the sensor 44 is dark, its conductivity is very low and insufficient current flows therethrough from the drive potential bus 54. Thus, there will be an extremely small potential drop across the load resistor 58 and the voltage on the modulation electrode will be close to zero volts. As explained above, in this condition, ions will be allowed to pass out of the housing to the charge receptor surface for generating a mark, i.e., a dark portion of the original document will cause the corresponding sensor to be dark, which in turn will subsequently create a dark mark on the charge receptor.

When light falls on the sensor 44 (as indicated by the arrows), its resistance is lowered and current flows through it from the drive potential bus 54 to the ground bus 56, through the load resistor 58. As the sensor resistance is much lower when fully illuminated, the potential drop thereacross is minimal, causing the node potential to be substantially equal to the drive potential. This potential, of about 20 to 30 volts dc, will appear upon the modulation electrode, causing the ions in its associated beam to be deflected to the grounded opposite wall. In this condition, ions will be prevented from exiting the housing and no mark will be generated upon the charge receptor, i.e., a light portion of the original document will cause the corresponding sensor to be light, which in turn will create no mark on the charge receptor. The charge will remain on the modulation electrode as long as the sensor is illuminated. As soon as the photosensor is made dark, the potential on the modulation electrode will be discharged to ground.

It can be readily appreciated that this arrangement approaches the epitome of simplicity of design for an electronic copier. No individual signal drivers are needed for each electrode; no addressing scheme is required. It is solely necessary that the marking head 32 have two bus lines, one for the single voltage supply and the other for the reference potential, which may be ground. The circuit is a simple potential divider which directly drives the modulation electrodes with an array of low-cost sensors in a one-to-one manner. All circuit elements, including the modulation electrodes, sensors, resistors and conductive traces, may be simply fabricated on a monolithic substrate by standard low temperature, thin film techniques.

Figure 5:
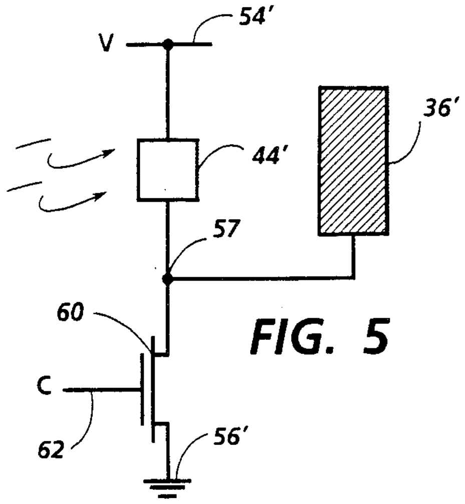
FIG. 5 is a schematic representation of a single stage of the array illustrated in FIG. 4.
Figure 4:
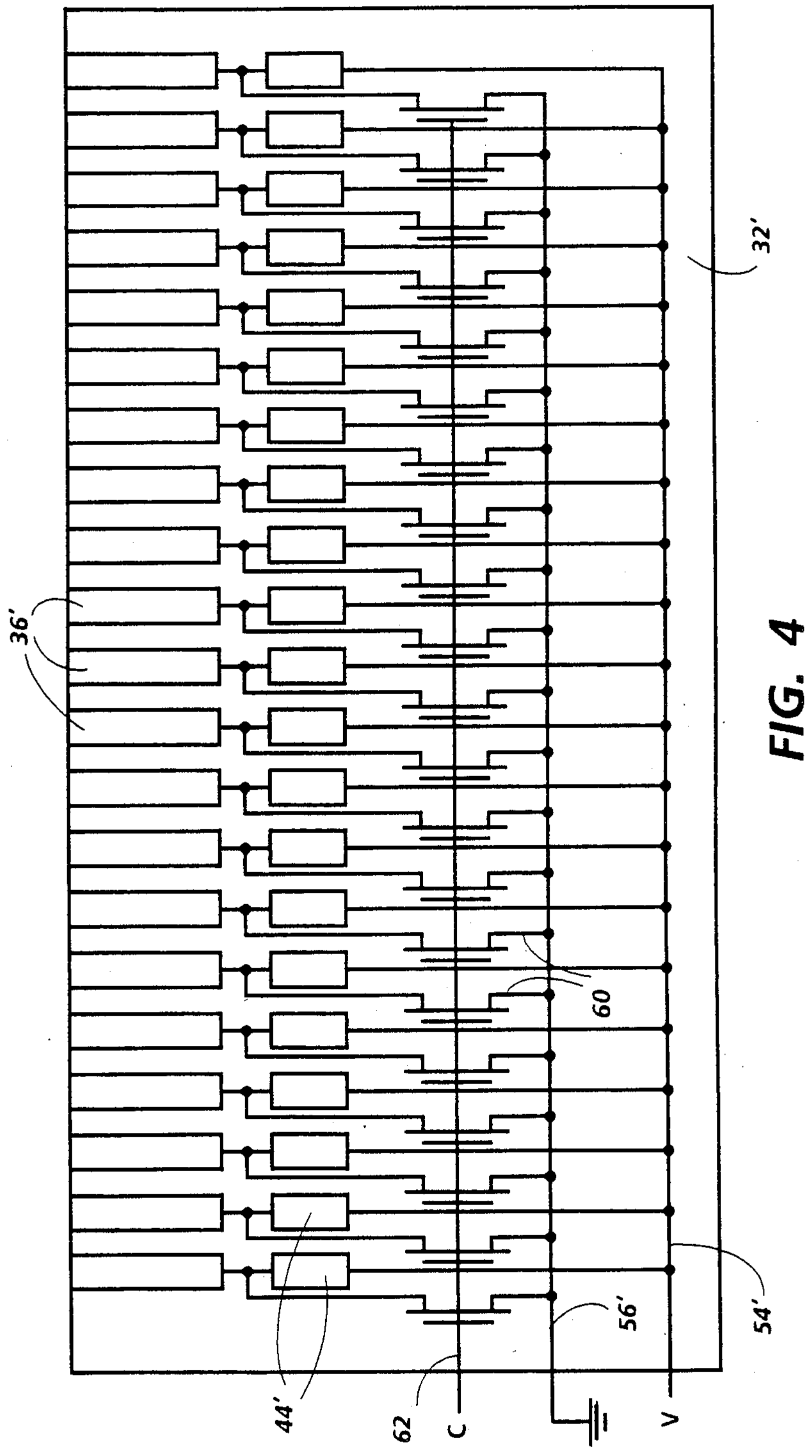
FIG. 4 is a schematic representation of another form of the marking head of the present invention.

Another embodiment for accomplishing one-to-one electronic copying is illustrated in FIGS. 4 and 5. The similar elements of marking head 32' are modulating electrodes 36', sensors 44', drive potential bus 54' and ground bus 56'. Additionally, a transistor 60 is connected between the ground bus and the node between the modulation electrode and the sensor. The gate electrode of each transistor 60 is connected to gate bus 62 which, in turn, is connected to a clock circuit C. During scanning, of the original document 46, the clock circuit is pulsed at predetermined timed intervals, corresponding to each scan line, for connecting the modulating electrode to ground, so as to "clear" its condition. Then, between clock pulses, when the transistor 60 is OFF, copying will occur as follows.

When the sensor is dark, its conductivity is very low and the prior ground condition on the modulating electrode will continue. However, when the sensor is illuminated, its resistance is lowered and the modulating electrode will be raised to substantially the potential of the drive potential bus 54', i.e., about 20 to 30 volts dc. Since very little current can leak through to ground for discharging the modulation electrode, until the transistor 60 provides such a path, this system is not adaptive, as is the embodiment of FIGS. 2 and 3. It requires timed clock pulses to clear the state of the modulation electrode for each scan line.

A further advantageous feature of the direct electronic copier system described in the above-defined embodiments, is that the response is not bimodal (ON/OFF), but is analog. This means that the number of ions displaced in each ion-laden transport fluid "beam" is proportional to the amount of charge on the modulation electrode which, in turn, is proportional to the amount of light which falls upon the sensor. The significance of proportional control of the passage of ions from the housing is that grey scale can be automatically reproduced.

In FIGS. 6 and 7, there are disclosed two types of photosensors whose advantages and disadvantages, for use in the electronic copier marking head, of this invention, will be discussed. The role of the photosensor is to scan documents at a reasonable speed (approximately 1 millisecond per line), develop sufficient voltage to drive the modulation electrodes, and provide sufficient contrast between light and dark areas in the scanned original document. It would also be desired if the photosensor had a photoconductive gain greater than unity, meaning that for each photon impinging upon the sensor, more than one electron is released.

Figure 6A:
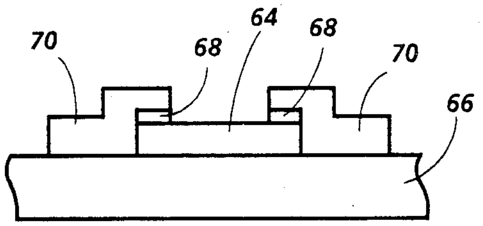
FIG. 6A is a schematic representation of one form of a gap cell photosensor.
Figure 6B:
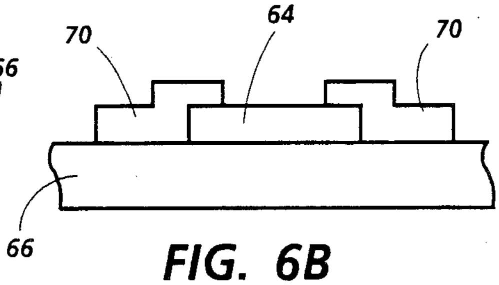
FIG. 6B is a schematic representation of another form of a gap cell photosensor.

The most satisfactory photosensor configuration for usage in the circuits of FIGS. 3 and 5 is the gap cell photoconductor structure, illustrated in FIGS. 6A and 6B. In 6A an intrinsic of doped, thin film charge transport layer 64 of amorphous silicon (a-Si:H), or amorphous silicon alloy, is deposited upon an insulating substrate 66, preferably of transparent material. Electrodes 68, of n-type doped a-Si:H are in contact with the a-Si:H thin film charge transport layer. Metal contacts 70 of a suitable material, such as Cr or Al are deposited on the electrodes. The contacts may be patterned and deposited subsequent to deposition of the a-Si:H thin film layer (in which case they overlie the layer, as shown) or may be patterned and deposited prior to deposition of the a-Si:H thin film layer (in which case they underlie the layer, not shown). Finally, a surface passivation overlayer of silicon nitride (not shown) may be deposited over the photosensor. If it is desired to project the document image from above, the passivation overlayer, rather than the substrate, must be made transparent. Alternatively, in FIG. 6B the metal contacts 70 are in direct contact with the charge transport layer 64.

The FIG. 6 embodiments are photoconductive devices through which current flows through the charge transport layer, in a direction parallel to the film surface, between the contacts 70, a distance of about 20 microns. Typically, this type of sensor is capable of sustaining an applied voltage of up to about 50 volts, has a photocurrent response time of about 1 millisecond, a photoconductive gain of about 5, and a dynamic range on the order of 25 dB.

Figure 7A:
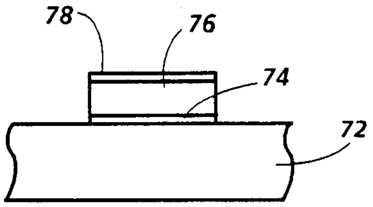
FIG. 7A is a schematic representation of one form of a sandwich cell photosensor.
Figure 7B:
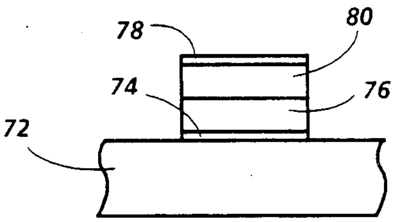
FIG. 7B is a schematic representation of another form of a sandwich cell photosensor.
Figure 7C:
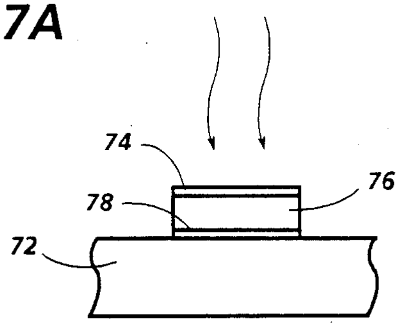
FIG. 7C is a schematic representation of yet another form of a sandwich cell photosensor.

An alternative photosensor configuration is illustrated in FIGS. 7A, 7B and 7C. This is a sandwich-cell phototransistor structure wherein the current flows through an active layer, in a direction perpendicular to the film surface. In FIG. 7A there is shown a transparent insulating substrate 72 supporting a transparent contact 74, for example, indium tin oxide (ITO) upon which the active layer 76 comprising a thin film layer of a-Si:H, typically 1 micron thick, is deposited. A second contact 78 of Al or Cr may be deposited directly thereover, or may be deposited upon an intermediate layer 80 of n-type a-Si:H, as illustrated in FIG. 7B. If it is desired to project the document image from above, the configuration of FIG. 7C would be preferred. A substrate 72 supports contact 78 with the active layer 76 either directly thereon or spaced therefrom by intermediate layer 80 (not shown). Transparent contact 74 overlies the active layer.

The FIG. 7 type of photosensor has a characteristically very fast photocurrent response time of about 1 microsecond, but can operate up to only about 5–10 volts before its dark leakage current becomes too big to be practical. Since this device also has a photoconductive gain of unity, insufficient photocurrent will be generated with many otherwise practical light sources, and it would have to be addressed by a very intense light source. The dynamic range is satisfactory at typically about 23 dB. It should be apparent that this device will not be satisfactory for use in the circuits of FIGS. 3 and 5 because it will not deliver the required charge to the modulating electrode, for high speed copying.

Figure 8:
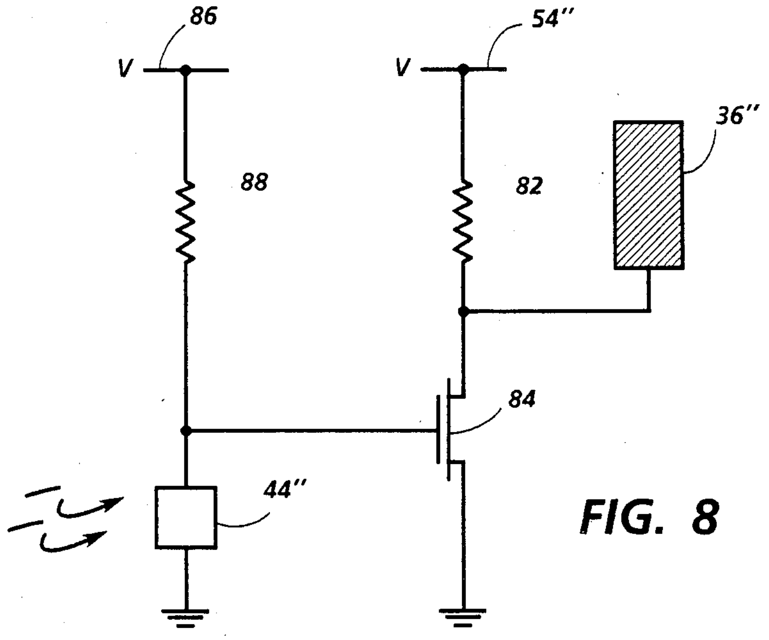
FIG. 8 is a schematic representation of an amplification circuit which may incorporate the sandwich cell photosensor.

However the FIG. 7 type of photosensor may satisfactorily be used on a marking head by incorporating an amplification circuit as shown in FIG. 8, wherein the low-voltage photosensor 44″ can be used to drive a highvoltage output stage. The modulation electrode 36″ is connected to a high-voltage source 54″ (about 30 volts) via a load resistor 82 and to ground via a transistor 84. The gate of the transistor is, in turn, connected to a low-voltage source 86 (about 5 volts) through load resistor 88 and to ground via the photosensor.

In operation, when the photosensor 44″ is dark, corresponding to a dark area on the original, no current will flow through it, so that there is no voltage drop across load resistor 88. Therefore, the gate of transistor 84 will be at 5 volts and the transistor is ON, allowing current to flow through it from the high-voltage source 54″ to ground. By properly selecting the resistance of the load resistor 82 to be high enough, the voltage drop thereacross will be large and the modulation electrode 36″ will have a very low voltage thereon. It will be insufficient to deflect ions passing through the outlet channel. Thus, when the sensor is dark, ions will exit the housing and a mark may be formed on the image receptor.

Conversely, when the sensor is illuminated, corresponding to a light area on the original, photocurrent will flow through the photosensor 44″ and load resistor 88 which, if properly selected, will cause the voltage on the gate of transistor 84 to be low, and the transistor will be turned OFF. Then no current will flow through load resistor 82, and the high voltage of about 30 volts will appear on the modulation electrode 36″ for deflecting ions moving therepast. Thus, when the sensor is illuminated, ions will not exit the housing and a light spot will appear on the image receptor, corresponding to the original.

Although this latter configuration allows the use of the much faster lowvoltage photosensor, it has the disadvantage that each circuit stage requires more components (i.e., an extra load resistor, an extra line bus, and a pass transistor). A marking head of this configuration could also be made with thin film fabrication techniques, but it would not be as simple and elegant as that illustrated in FIGS. 2 and 4.

It should be understood that the present disclosure has been made only by way of example, and that numerous changes in details of construction and the combination and arrangement of parts may be resorted to without departing from the true spirit and scope of the invention as hereinafter claimed.

What is claimed is:

1. A fluid jet assisted ion projection copier including means for projecting ions upon a charge receptor surface, said means for projecting comprising an ion generator, an inlet channel and an outlet channel connected to said ion generator, a source of transport fluid in communication with said inlet channel for delivering transport fluid to move ions through said outlet channel, and modulation means located adjacent said outlet channel for controlling the passage of ions therethrough, and means for projecting incremental images of light and dark areas of an original to be copied, said ion projection copier characterized by comprising a writing head mounted upon said means for projecting ions and adjacent to said outlet channel said writing head including thin films elements integrally formed thereon including an array of modulating electrodes elongated in the direction of fluid flow, an array of photosensors, one photosensor being associated with each modulating electrode, and a bias potential bus for charging selected ones of said modulating electrodes in response to the state of illumination on selected ones of said photosensors.

2. The fluid jet assisted ion projection copier as defined in claim 1 characterized in that the amount of charge imposed upon said selected ones of said modulating electrodes is proportional to the state of illumination reaching said photosensors.

3. The fluid jet assisted ion projection copier as defined in claim 1 characterized in that said writing head further includes an array of load resistors, one load resistor being associated with each photosensor, and each of said photosensors is connected to a reference potential through its associated load resistor.

4. The fluid jet assisted ion projection copier as defined in claim 1 characterized in that said photosensors are made of amorphous semiconductor material.

5. The fluid jet assisted ion projection copier as defined in claim 1 characterized in that said photosensors are made of amorphous silicon.

6. The fluid jet assisted ion projection copier as defined in claim 1 characterized in that said writing head further includes an array of switches, one switch being associated with each photosensor, and each of said photosensors is connected to a reference potential bus through its associated switch.

7. The fluid jet assisted ion projection copier as defined in claim 6 characterized in that said switches are thin film transistors.

8. The fluid jet assisted ion projection copier as defined in claim 7 characterized in that said photosensors and said thin film transistors are made of amorphous semiconductor material.

9. The fluid jet assisted ion projection copier as defined in claim 7 characterized in that said photosensors and said thin film transistors are made of amorphous silicon.

10. The fluid jet assisted ion projection copier as defined in claim 6 characterized by including a switch control bus, connected to all of the switches in said array, and timing means for periodically changing the state of said switches to allow any charge stored on said modulating electrodes to drain to said reference potential bus.

11. The fluid jet assisted ion projection copier as defined in claim 1 characterized in that said photosensors are thin film gap cell transistors.

12. The fluid jet assisted ion projection copier as defined in claim 1 characterized in that said writing head further includes a second bias potential bus for connecting a lower potential source, than that connected to said bias potential bus, to said photosensors, and an array of switches, one switch being associated with each photosensor, each switch being controlled by the conductive state of its associated photosensor for selectively applying the potential on said bias potential bus to its associated modulating electrode.

13. The fluid jet assisted ion projection copier as defined in claim 12 characterized in that said switches are thin film transistors.

14. The fluid jet assisted ion projection copier as defined in claim 12 characterized in that said photosensors are thin film sandwich cell transistors.

* * * * *